E. SCOFIELD.
COLANDER.
APPLICATION FILED JULY 19, 1917.
1,267,466.
Patented May 28, 1918.
2 SHEETS—SHEET 1.
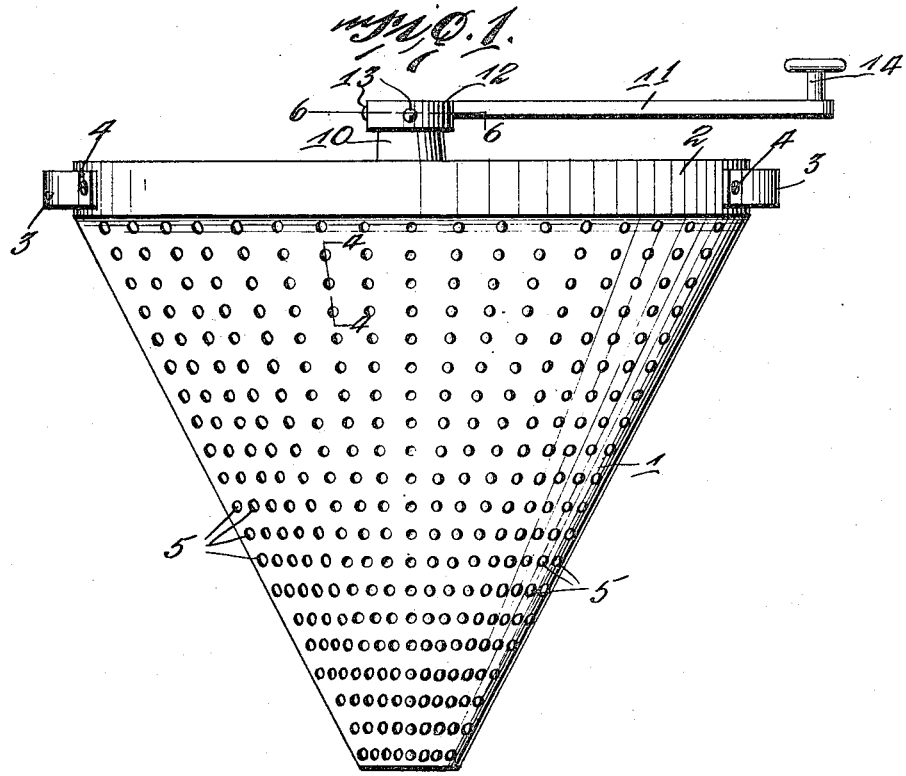
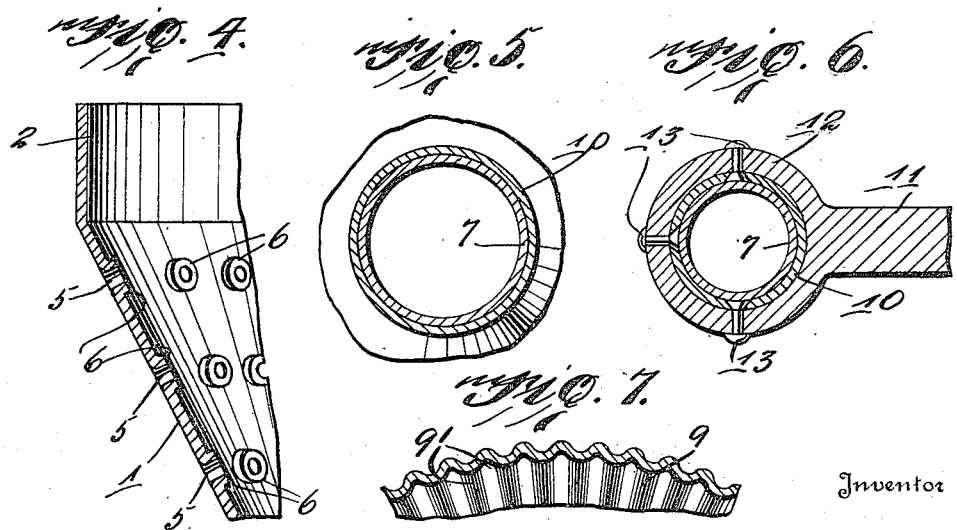
Inventor
E. Scofield.
By her Attorneys

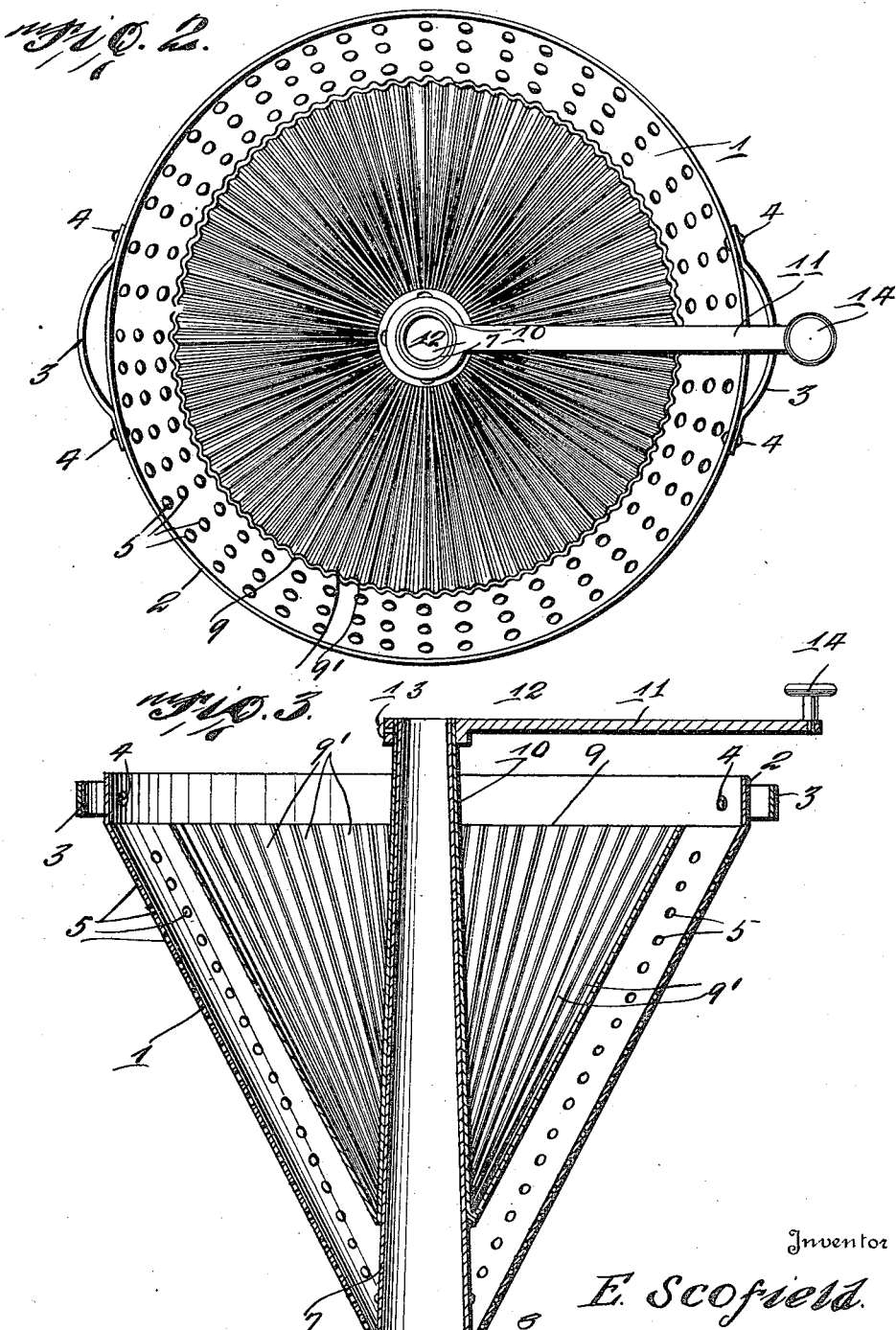

UNITED STATES PATENT OFFICE.

ESTHER SCOFIELD, OF TIPTON, INDIANA, ASSIGNOR OF ONE-HALF TO JAMES E. FISHER, OF TIPTON, INDIANA.

COLANDER.

1,267,466.

Specification of Letters Patent.

Patented May 28, 1918.

Application filed July 19, 1917. Serial No. 181,485.

*To all whom it may concern:*

Be it known that I, ESTHER SCOFIELD, a citizen of the United States of America, residing at Tipton, in the county of Tipton and State of Indiana, have invented certain new and useful Improvements in Colanders, of which the following is a specification, reference being had therein to the accompanying drawing.

This invention relates to a colander and has for its principal object the production of a structure, which will efficiently force the fruit which is within the colander through the openings formed in the outer casing, while the skins and stems will be retained within the colander.

Another object of this invention is the production of a colander wherein a corrugated rotary cone is mounted with the outer casing, so as to force fruit which is within the colander through the openings formed in the outer casing.

Another object of this invention is the production of a colander wherein the outer casing is provided with an integral column, while a rotary cone is also provided with a column thereby allowing the column of the cone to fit upon the column of the casing for rotatably supporting the cone within the casing.

With these and other objects in view this invention consists of certain novel combinations and arrangements of parts, as will be hereinafter fully described and claimed.

In the accompanying drawings:—

Figure 1 is a side elevation of the colander as constructed in accordance with this invention.

Fig. 2 is a top plan view of the colander.

Fig. 3 is a central vertical section through the colander.

Fig. 4 is an enlarged fragmentary sectional view through a portion of the outer casing, as taken on line 4—4 of Fig. 1, illustrating how the outer casing may be perforated to form openings in such a manner as to provide annular flanges upon the inner portions of the casing and adjacent the openings.

Fig. 5 is a horizontal section through the columns, illustrating how the same engage each other.

Fig. 6 is a section taken on line 6—6 of Fig. 1, showing the manner in which the handle is secured to the column of the cone.

Fig. 7 is an enlarged fragmentary perspective view of a portion of the cone.

By referring to the accompanying drawings, it will be seen that the outer casing 1 is substantially conical in shape, although at its upper portion there is formed a circular rim 2. The handles 3 are riveted as indicated at 4, to the rim 2, so as to permit the column to be easily moved from one position to another. This casing 1 is provided with a plurality of openings 5, formed therein, as shown clearly in Figs. 1 to 3 inclusive. Owing to the smallness of these figures the openings are not shown as provided with the usual annular flanges, which are formed in the openings in a sheet of metal, but are constructed by being punched inwardly by any suitable instrument. By referring particularly to Fig. 4, the flanges 6 are clearly shown, which are formed by merely punching the openings in the outer casing.

The column 7 of the outer casing is formed integrally upon this casing as indicated at 8, and projects centrally within the casing so as to protrude above the upper portion of the rim 2, as shown clearly in Figs. 1 and 3. This column 7 is cylindrical in cross section, although it tapers toward its upper end. It is further obvious that this column 7 although constituting a support, is hollow shaped, so as to reduce its weight to a minimum.

The rotary cone 9 is corrugated as shown clearly in Fig. 7, and the corrugations 9' of the cone 9 extend vertically with respect to the outer edge of the cone. The hollow column 10 is formed integral upon the cone 9, and projects centrally within the cone 9, as is evident in Figs. 1 to 3 of the drawings. This column 10 is also cylindrical in cross section, and tapers toward its upper end being similar to the column 7 in construction, although being slightly larger than the column of the casing.

The handle 11 is provided with a ring 12, which is positioned upon the upper end of the column 10, and is riveted, as shown at 13, to the column 10, for holding the ring 12 against accidental displacement. It is, of course, obvious that any other securing means desired may be employed for holding the ring against accidental displacement. This handle 11 is provided with a grip 14, for facilitating the swinging of the handle in a circle. It should further be understood that as the columns taper toward their upper end the handle may be wedged upon the tapered end of the column 10, since rotary action imparted to this column by the handle will necessarily cause pressure to be implied to the handle, and will also in turn be imparted to the column. The column will be wedged upon the upper end portion of the column 10, of the cone 9, so as to relieve the strain from the rivets 13, or if so desired may relieve the necessity of providing the rivets, so that the handle may be detached if so desired.

When the colander is in operation the cone may be removed from within the outer casing and the fruit may then be placed within the outer casing surrounding the column 7. The lower end of the column 10 may then be positioned upon the upper end of the column 7 and the cone 9 may then be rotated by the swinging of the arm 11. As the cone is rotated the casing which is corrugated will efficiently grip the fruit and prevent the same from slipping upon the surface of the cone, as would be the case if the inner surfaces of the cone were smooth, instead of being corrugated. Continued rotary motion of the cone will cause the fruit within the outer casing to be caught between the corrugations and the flanges, surrounding the openings, so as to cause the fruit to be easily shredded or torn to pieces. This will facilitate the forcing of the fruit through the openings 5 formed in the outer casing, so as to permit the fruit thus forced from the colander, to be caught by a suitable receptacle. The stems and skins of the fruit will be retained within the outer casing and may be easily emptied therefrom, after the fruit has been forced through the openings. Because of the tapering construction of the columns, it is obvious that the column 10 will gradually feed downwardly upon the column 7, of the outer casing so as to force the fruit through the outer casing through the openings formed therein. It is further obvious that since the columns are formed of sheet metal and are formed integral upon the outer casing of the cone, the colander will be comparatively light in structure, although its strength will be materially increased over independent columns which might be applied to shelves and cones of this construction.

It is, of course, obvious that many minor detail changes may be made in the construction of this invention, without departing from the sprit of the same, and it is therefore, not intended to limit the invention to the specific form as herein disclosed, but to include such forms as properly come within the scope of the claim.

What is claimed is:—

In a device of the class described, the combination of an outer casing provided with a rim, a primary hollow cone-like column attached to said outer casing, an inner casing positioned within said outer casing, said inner casing provided with a hollow cone-like column resting upon the hollow column of the outer casing, the cone-like structure of the primary column constituting means for preventing the inner casing from dropping to the bottom of the outer casing, the columns of both casings extending about the rim of the outer casing, means attached to the column of the inner casing for producing a relative rotation between the inner and the outer casings.

In testimony whereof I hereunto affix my signature.

ESTHER SCOFIELD.